(12) United States Patent
Petersen et al.

(10) Patent No.: US 8,197,207 B2
(45) Date of Patent: Jun. 12, 2012

(54) INDIVIDUAL BLADE NOISE MEASUREMENT SYSTEM AND METHOD FOR WIND TURBINES

(75) Inventors: Andreas Petersen, Rheine (DE); Lothar Wittekind, Osnabruck (DE); Heiko Kraft, Rheine (DE)

(73) Assignee: General Electric Company, Schenectady, NY (US)

( * ) Notice: Subject to any disclaimer, the term of this patent is extended or adjusted under 35 U.S.C. 154(b) by 1200 days.

(21) Appl. No.: 11/967,410

(22) Filed: Dec. 31, 2007

(65) Prior Publication Data

US 2010/0284787 A1   Nov. 11, 2010

(51) Int. Cl.
*F03D 7/04* (2006.01)

(52) U.S. Cl. .......................................... 416/61
(58) Field of Classification Search ............. 416/61, 416/62

See application file for complete search history.

(56) References Cited

U.S. PATENT DOCUMENTS

| | | | |
|---|---|---|---|
| 7,059,833 B2* | 6/2006 | Stiesdal et al. | 416/41 |
| 7,883,319 B2* | 2/2011 | Volkmer | 416/61 |
| 2004/0013524 A1* | 1/2004 | Wobben | 416/61 |

FOREIGN PATENT DOCUMENTS

| | | | | |
|---|---|---|---|---|
| JP | 2001020848 A | * | 1/2001 | |
| JP | 2003254226 A | * | 9/2003 | |
| JP | 2004293527 A | * | 10/2004 | |
| WO | WO 2006012827 A1 | * | 2/2006 | |

OTHER PUBLICATIONS

Noise From Wind Turbines Standards and Noise Reduction Procedures, H. Klug, Sep. 16-20, 2002.
Wind Turbine Noise Issues, Anthony L. Rogers, Ph.D. and James F. Manwell, Ph.D., Mar. 2004.

* cited by examiner

*Primary Examiner* — Richard Edgar
(74) *Attorney, Agent, or Firm* — McNees Wallace & Nurick LLC

(57) ABSTRACT

A method for configuring blades of a wind turbine for low noise generation. The method includes providing at least one noise measuring device. The noise measuring device is arranged and disposed in a position to measure noise of the blades during rotation. The wind turbine is configured to include a rotational trigger, the rotational trigger being arranged to provide a signal at a predetermined rotational position of the wind turbine blades. One or more of the blades is configured with an aerodynamic modifying device. Noise level is measured with the noise measuring device during wind turbine operation. The noise produced by each of the blades is determined. The blades are configured in response to the noise determined for each of the blades. A method for measuring the noise level generated by an individual blade and a wind turbine configured for desired noise level are also disclosed.

18 Claims, 6 Drawing Sheets

INDIVIDUAL BLADE NOISE MEASUREMENT SYSTEM AND METHOD FOR WIND TURBINES

FIELD OF THE INVENTION

The present invention is directed to methods for installing and/or configuring wind turbines. In particular, the present invention is directed to measuring, analyzing and configuring wind turbines for operation based upon noise level generated by the wind turbine blades.

BACKGROUND OF THE INVENTION

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators. As the blades are rotated by the wind, noise is inherently generated.

International standards exist to measure noise level produced by wind turbines. The existing system and standards measure an overall noise level produced by the wind turbine, typically from a fixed point. This overall noise level is utilized to configure the wind turbine with noise reduction equipment. Configuring of wind turbine blades for noise levels requires long and costly steps including outfitting of the blades, evaluating the blade set over a testing period wherein the process is then repeated for new blade arrangement. Such steps require multiple iterations, each iteration requires rigging of all of the blades. The rigging of these blades may require lifting equipment, personnel and time. Wind turbine blades and associated equipment may be large or heavy, requiring specialized equipment that is expensive to operate. Further, wind turbines may be installed on uneven terrain and/or on very high towers (e.g., towers that are at least 60 meters in height) that are inaccessible to mobile land-based cranes. The installation, servicing and configuration may be very expensive and time consuming.

What is needed is a method and system for configuring and/or analyzing wind turbine blade noise level that permits configuration of the wind turbine and provides individual blade noise levels for configuration and operation of the wind turbine, wherein the process does not require the expensive and labor-intensive processes of the known noise level measurement and configuration systems.

SUMMARY OF THE INVENTION

One aspect of the present invention includes a method for configuring blades of a wind turbine for low noise level generation. The method includes providing at least one noise measuring device. The noise measuring device is arranged and disposed in a position to measure noise of the blades during rotation. The wind turbine is configured to include a rotational trigger, the rotational trigger being arranged to provide a signal at a predetermined rotational position of the wind turbine blades. One or more of the blades is configured with an aerodynamic modifying device. Noise level is measured with the noise measuring device during wind turbine operation. The noise level produced by each of the blades is determined. The blades are configured in response to the noise level determined for each of the blades.

Another aspect of the present disclosure includes a method for determining the noise level generated by a wind turbine blade. The method includes providing at least one noise measuring device and arranging and disposing the noise measuring device in a position to measure noise level of the blades during rotation. The wind turbine is configured to include a rotational trigger, the rotational trigger being arranged to provide a signal at a predetermined rotational position. Noise level is measured with the noise measuring device during wind turbine operation. Time between signals generated by the rotational trigger is measured. The noise level measured by the noise measuring device is correlated to the time between signals to determine the noise level generated by each blade during operation. The noise level produced by each of the blades is thereby determined.

Still another aspect of the present disclosure includes a wind turbine configured for desired noise production. The wind turbine includes a plurality of wind turbine blades. In addition, a rotational trigger is arranged and disposed to provide a signal at a predetermined rotational position of the blades. Each of the blades is individually configured for noise reduction and the configuration including one or more the blades having aerodynamic modification devices, the arrangement of the aerodynamic modification devices is determined in response to noise level measured on each individual blade.

Advantages to an embodiment of the disclosure include the ability for different noise reduction measures to be tested simultaneously at one turbine. In addition, the noise measurement and analysis procedure permit the determination of individual noise level and noise level spectra of wind turbine blades.

The ability to measure noise level at individual blades allows time and cost reduction due to fewer measurements, crane actions and reduced blade preparation. Furthermore, the method of the present disclosure has lower uncertainty and greater noise level measurement detail than standard International Standard measurements.

The method also allows consistent and reliable noise level measurements at various dissimilar locations substantially independent of the environmental and site conditions.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
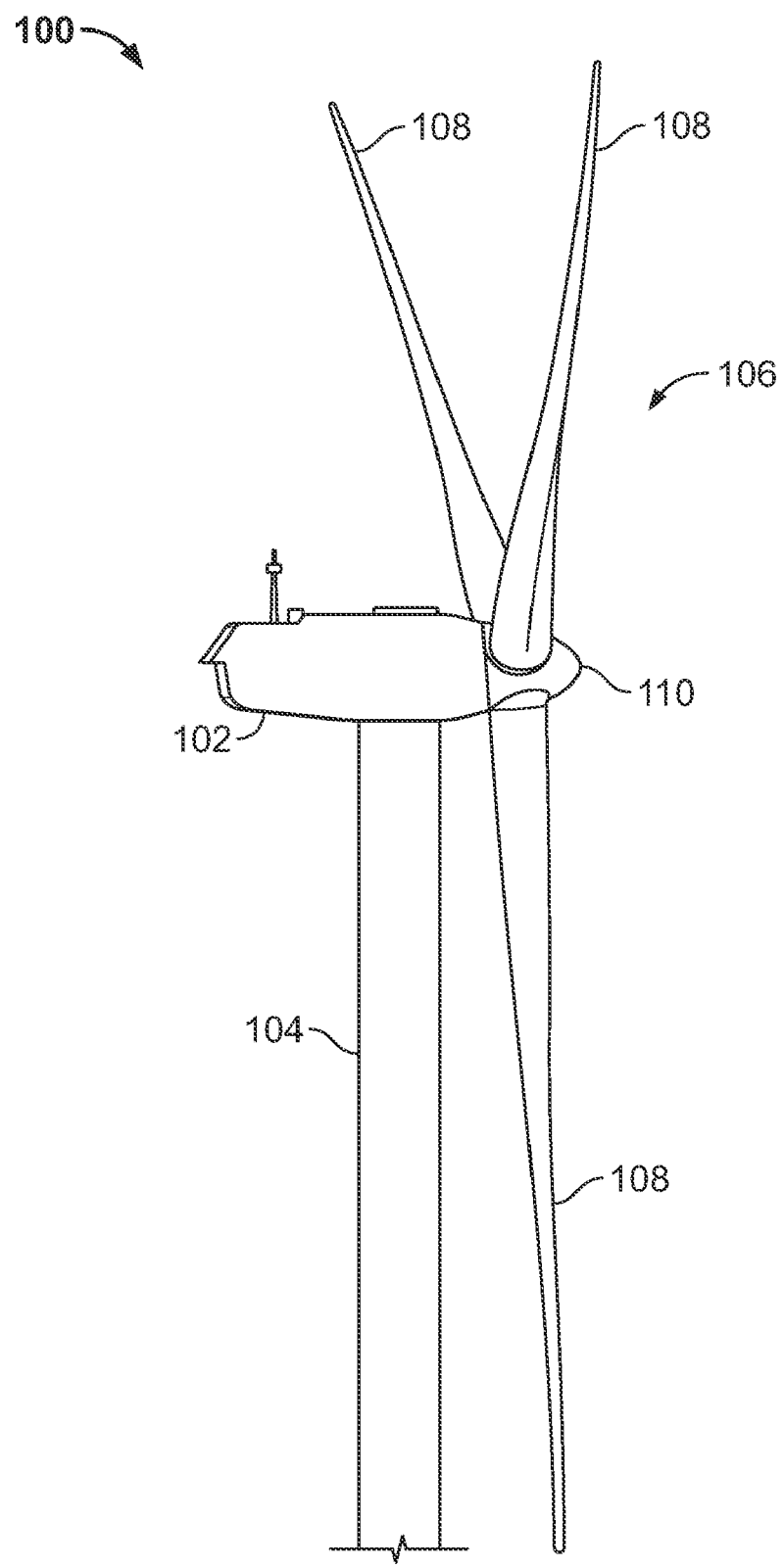
FIG. 1 is a side view of a wind turbine according to an embodiment of the present disclosure.

As shown in FIG. 1, a wind turbine 100 generally comprises a nacelle 102 housing a generator (not shown in FIG. 1). Nacelle 102 is a housing mounted atop a tower 104, only a portion of which is shown in FIG. 1. The height of tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention. As the blades 108 rotate, noise is generated. "Noise level", "noise" and grammatical variations thereof, as utilized herein includes a unit of measure of sound pressure level or sound power level measured in decibels or other sound pressure level units.

Figure 2:
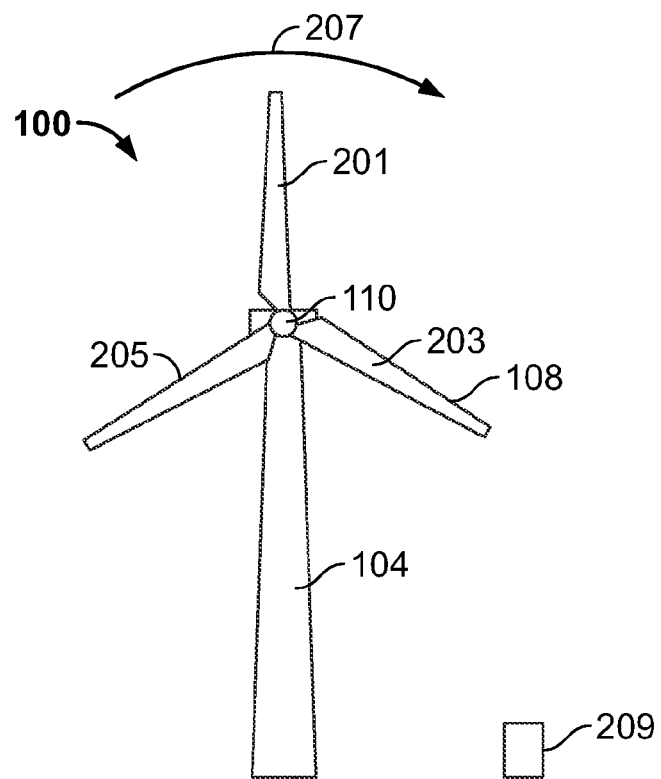
FIGS. 2-4 show various rotational positions of wind turbine blades utilizing a method according to an embodiment of the present disclosure.

FIG. 2 shows a wind turbine 100 having a first blade 201, a second blade 203, and a third blade 205 rotatable in direction 207. A noise measuring device 209 is arranged at a location disposed to measure noise from individual blades. The noise measuring device 209 may be any device capable of measuring noise or sound pressure level, including, but not limited to a microphone, acoustical camera, laser doppler vibrometer or other sound measuring or detection device, including devices that directly measure sound pressure level or indirectly via contact-less measurements. The noise-measuring device 209 is positioned in a location suitable for measuring the noise generated from a single blade 108, while noise generated by the other blades in minimized to reduce interference with the noise measurements of the individual blades. For example, the noise-sensing device may be disposed below the down stroke of the blades 108. However, the positioning is not so limited and may include any location in which the magnitude of the noise generated by one blade is distinguishable from the noise generated by the other blades 108.

FIG. 2 includes first blade 201 in a 12 o'clock or zero degree position (i.e., a vertical position above the hub 110). In one embodiment, a rotational trigger is activated by the position of first blade 201. As the blades 108 rotate in direction 207, the time required for the first blade 201 to rotate and return to the zero degree position is measured by measuring the time between signals from the rotational trigger. The time is correlated to a rotational position (i.e., degrees from 0° to 360°) so that the measured sound power level may be further correlated to the blade 108 position. The rotational trigger may be any device that permits the recording of a position of one or more blades 108. For example, the rotational trigger may be activated at a single position during a single rotation of the blades 108 or may be at several or continuously along the rotation of the blades 108. In one embodiment, the rotational trigger is a mechanical feature, such as a protrusion, indentation, feature or lug on the shaft about which the hub 110 and blades 108 rotate. As the mechanical feature passes a predetermined point during rotation, a signal is produced and time is recorded. In other embodiment, the rotational trigger is an electrical switch that sends a signal when the shaft rotates past a predetermined location. In addition, the time between activation of the rotational trigger is also measured. During the rotation, noise level is measured with a noise measuring device 209. The rotational position of the first blade 201 is determined by correlating a rotational position over time between signals from the rotational trigger. By "correlating", it is meant that the time for a single rotation is measured and compared or plotted against the noise level magnitudes for this same period of time. Correlating the noise level measured by the noise measuring device includes normalizing the time between two trigger signals to 0° to 360° degree (rounded) to reduce or eliminate the dependency of rotor speed. Such correlation permits the identification and magnitude of the noise levels for the particular blades 108 (see e.g., FIG. 5). For example, in FIG. 2, the first blade 201 or reference blade, is in the zero degree position, wherein the rotational trigger is activated. As the blades 108 rotate in direction 207, the time required for the first blade 201 to rotate and return to the zero degree position is measured by measuring the time between signals from the rotational trigger.

Figure 3:
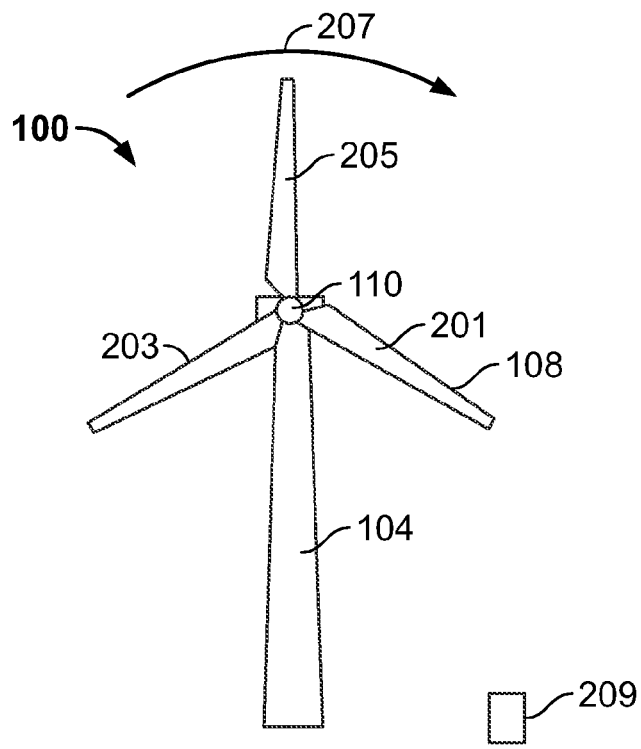
Figure 4:
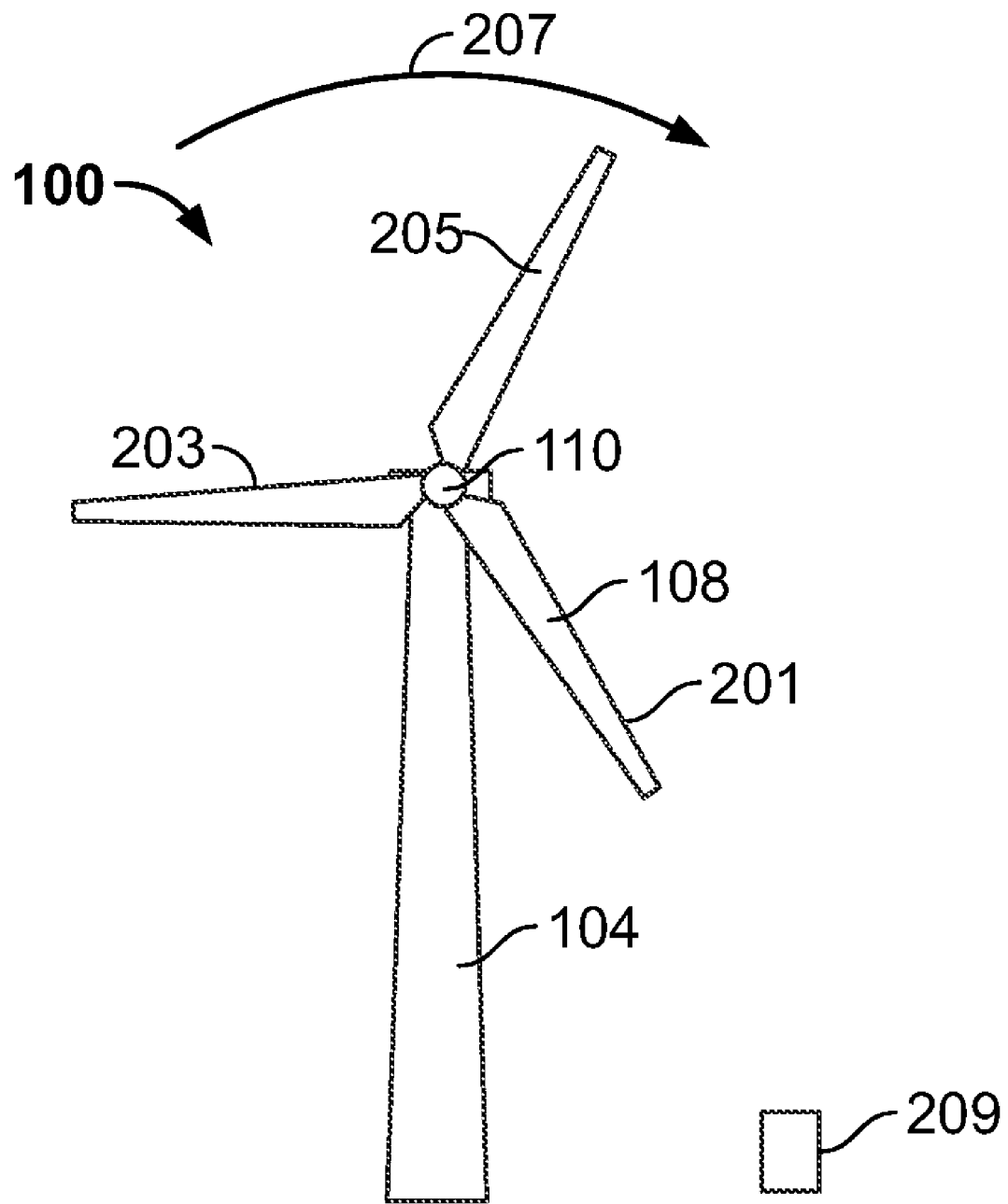
Figure 5:
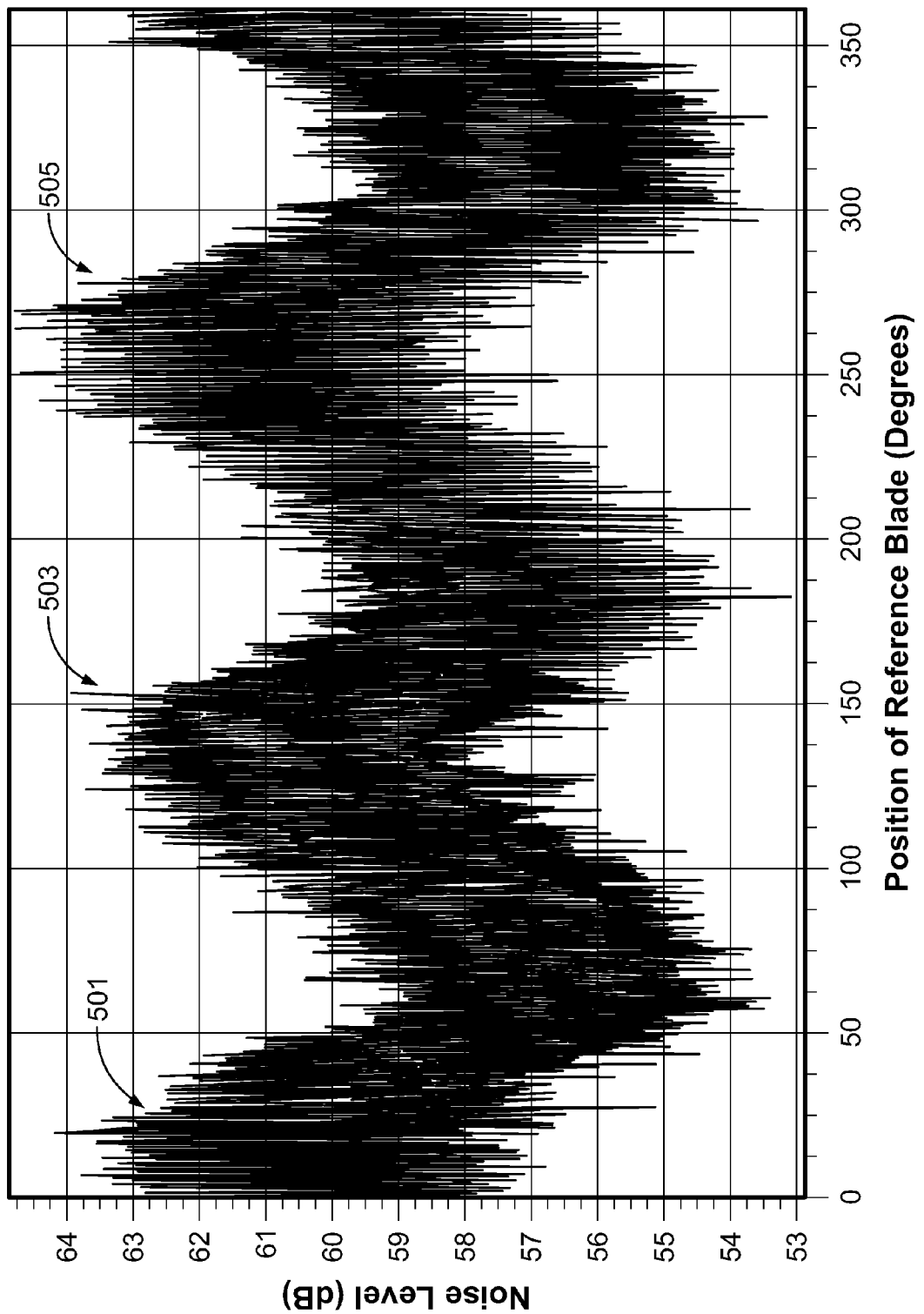
FIG. 5 shows data including noise level with respect to various rotational positions of individual blades measured according to a method of the present disclosure.

FIG. 3 shows the first blade 201 in a rotated position, wherein the first blade 201 has rotated in a direction 207 toward the noise-measuring device 209. A noise level at or near a maximum noise level may be measured at noise measuring device 209 when first blade 201 is in the position shown in FIG. 4. As the blades 108 rotate, the noise measuring device 209 obtains continuous measurements of levels of noise detected from the blades 108 of the wind turbine 100. As can be seen in FIG. 5, several maximums in noise level may occur, the maximums being associated with each of the blades 108.

FIG. 5 shows an example of the noise level measured at the noise-measuring device 209 during the rotation of the blades 108. The graph illustrates noise level in decibels, but any other sound pressure level units may be utilized. As shown in the graph, the noise level is shown with respect to position in radial degrees. As the first blade 201 passes a zero degree mark (i.e., vertically oriented above the hub 110), the rotational trigger is activated and signal corresponding to the position of the first blade 201 is recorded. While, the rotational trigger is illustrated as a signal corresponding to the zero degree position, the rotational trigger may be activated at any suitable position or at multiple positions. As the first blade 201 rotates, the position of the first blade 201 is determined by measuring noise level at the noise-measuring device 209 continuously over time until the rotational trigger is activated again, marking the completion of the rotation of the first blade 201. The rotational positioning over time is correlated to the noise level measured at the noise-measuring device 209 and the magnitudes are shown in FIG. 5 over an entire single rotation. The data for the single rotations may be stored for later analysis or may be utilized to aggregate data for multiple rotations. As can be seen in FIG. 5, peaks appear in the noise levels between the activation of the trigger. As the first blade 201 activates the rotational trigger, the second blade 203 is in a position wherein the noise level produced by the second blade 203 is near a maximum (e.g., about 120° of rotation). This is shown as the first peak 501. Likewise, second peak 503 corresponds to the first blade 201 and the third peak 505 corresponds to the third blade 205.

As the individual blade 108 noise level measurements are determinable by the noise-measuring device 209 correlated to blade position between rotational trigger activations, these magnitudes may be compared to determine the blade 108 and the blade configuration that is creating, for example, the greatest amount of noise.

Figure 6:
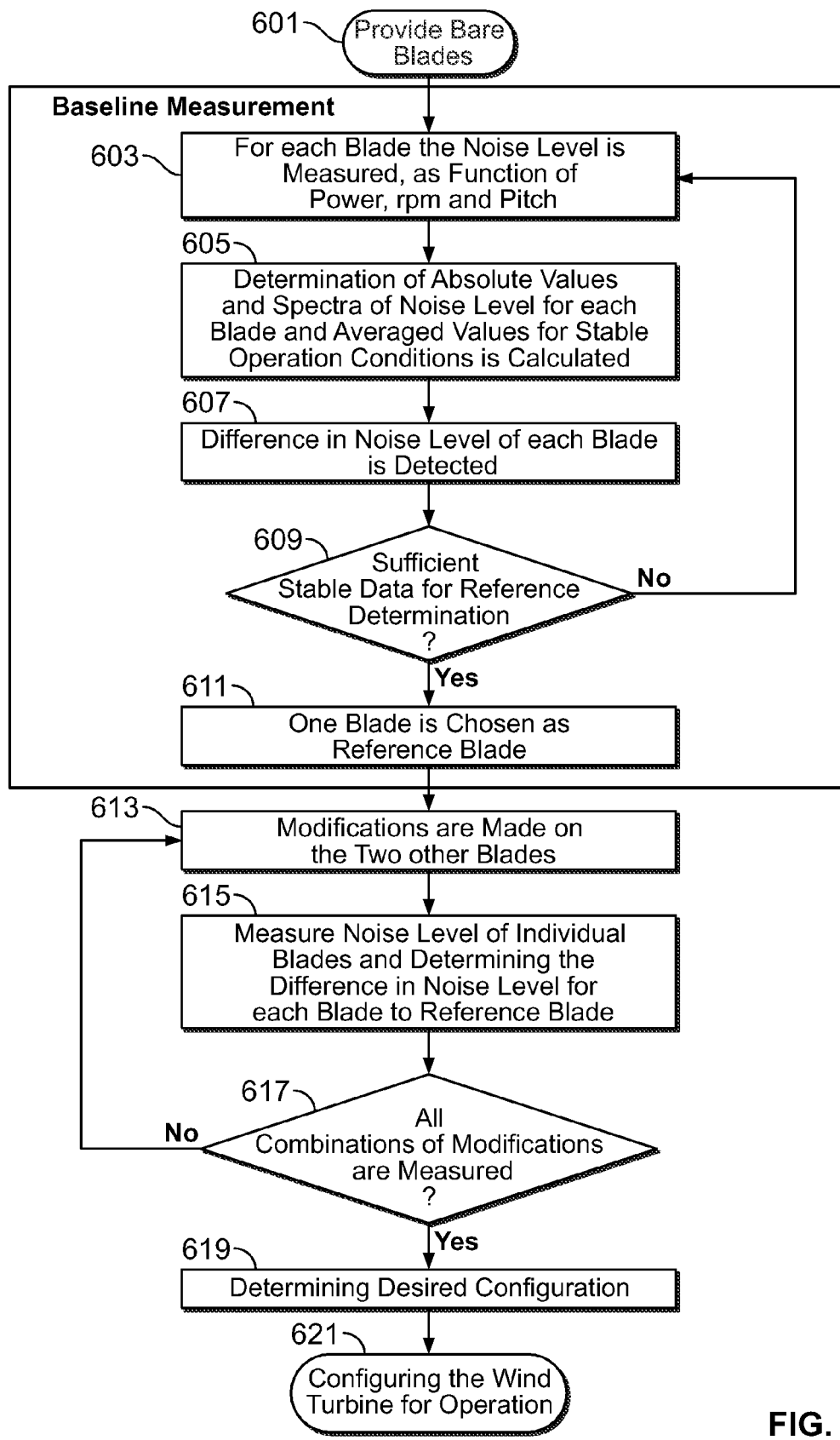
FIG. 6 shows a process flowchart according to an embodiment of the present disclosure.

FIG. 6 illustrates a method for configuring a wind turbine 100 for a desired noise level according to an embodiment of the present disclosure. The method includes measuring sound pressure level or noise level with noise measuring device 209 during wind turbine 100 operation. A wind turbine 100 is configured with blades 108 having few or no aerodynamic modification devices (i.e., bare blades), step 601. Noise level is measured as a function of power, rpm and/or pitch of the blades 108, step 603. As discussed more fully above, the noise level of the individual blades 108 is measured by recording the rotational position using time between activation of the rotational trigger with respect to the noise level measured at the noise measuring device 209 and observing the absolute peaks of the noise level measured. The noise level is then averaged using suitable averaging calculations against stable operating conditions to determine the absolute noise level and optimum noise levels for the individual blades, step 605. The data obtained is compared for each blade with respect to each other, step 607. The data is analyzed to determine the stability of the data and to determine whether the stability is sufficient to determine the absolute noise level desired by the individual blades 108, step 609. While not so limited, stable data may include a predetermined minimum number of data values per blade and wind bin, distributed over a turbine operational range. For example, each wind bin (e.g., 5.5 to 6.5 m/s) may be filled with at least 36 valid and undisturbed data points. If there is not sufficient stable data, steps 603-609, the process is repeated with measuring the noise of the individual blades 108 at step 603. If sufficient stable data exists, then a blade 108 is selected as a reference blade, step 611. While not so limited, the reference blade may be selected as the blade having the least value for noise level.

At least one of the blades 108, preferably two, are removed from the wind turbine and outfitted with noise reduction devices, step 613. Noise reduction devices may include, but are not limited to aerodynamic modification devices. Aerodynamic modification devices may be arranged and disposed on the blades 108. In other embodiments, blades 108 configured with differing aerodynamic profiles (e.g., varied airfoil geometries) may also be substituted for the blades 108 to determine the noise generated. The aerodynamic modification devices may include, but are not limited to turbulator holes, zig-zag (ZZ) turbulator tape, stall strips, vortex generators, Gurney flaps, acoustical flaps, any combinations thereof, or any other device or configuration capable of manipulating the aeorodynamic flow over the blade 108. The arrangement of noise reduction devices selected may be based on any criteria. For example, the arrangement may be a random arrangement, a preselected arrangement or an arrangement in response to historical data of configurations for a particular wind turbine or environment. Noise level is measured as a function of power, rpm and/or pitch of the blades 108, step 615. The noise level is then averaged against stable operating conditions to determine the absolute noise level and optimum noise levels for the individual blades, step 615. The data obtained in compared for each blade with respect to each other, step 615. The data is analyzed to determine the stability of the data and to determine whether the stability is sufficient to determine the absolute noise level desired by the individual blades 108, step 615. Thereafter, a determination is made whether all of the desired combinations of configurations of blades has been measured, step 617. If the combinations are insufficient, the blades 108 are reconfigured and the measurements are continued in step 615. However, if all of the combinations have been measured and recorded, the noise levels desired are determined and the configuration associated with the desired noise level is determined, step 619. While not so limited, the desired noise levels may be a minimum amount of noise, may be a noise level established by local ordinance or statute, or may be an optimal noise level with respect to cost or turbine efficiency. The blades 108 are provided with the configuration associated with the desired noise level and the wind turbine is permitted to operate, step 621.

Figure 7:
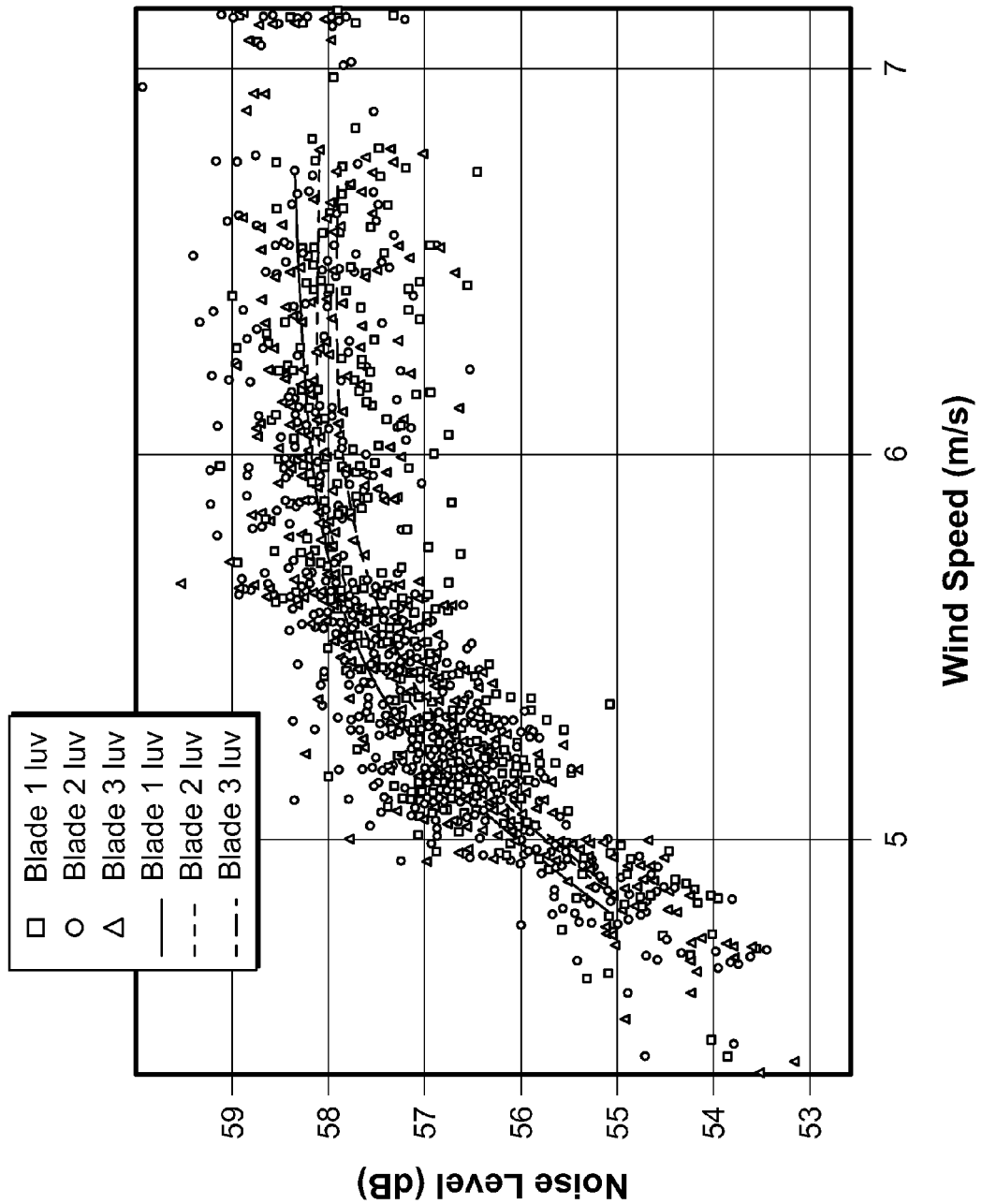
FIG. 7 shows data including noise level with respect to wind speed of individual blades measured according to a method of the present disclosure.

In order to determine the optimal configurations of noise reduction devices, the present method of measuring noise level permits the analyzing of many different wind turbine parameters, including, but not limited to wind speed, turbine output, rpm, pitch of the blades 108 or a variety of other wind turbine parameters. For example, FIG. 7 shows noise levels with upwind measurements (LUV) over a period of time with respect to wind speed. Utilizing the data obtained at the noise measuring device 209, the optimum or desired configuration of blade 108 may be obtained with respect to a variety of wind speeds. Additional data manipulation may also be provided, wherein comparisons with respect to any of the wind turbine parameters may be accomplished in order to determine the desired or optimum configuration for noise levels generated by the wind turbine 100.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for configuring blades of a wind turbine for low noise generation comprising:
    providing at least one noise measuring device;
    arranging and disposing the noise measuring device in a position to measure noise of the blades during rotation;
    configuring the wind turbine to include a rotational trigger, the rotational trigger being arranged to provide a signal at a predetermined rotational position of the wind turbine blades;
    configuring one or more of the blades with an aerodynamic modifying device;
    measuring noise level with the noise measuring device during wind turbine operation;
    determining the noise produced by each of the blades; and
    configuring the blades in response to the noise determined for each of the blades.

2. The method of claim 1, wherein the noise measuring device is a microphone.

3. The method of claim 1, wherein the rotational trigger is a mechanical feature on a shaft around which the blades rotate.

4. The method of claim 1, wherein the rotational trigger is configured to be activated at a preselected blade position.

5. The method of claim 1, wherein the rotational trigger is an electronic switch arranged to be activated at a preselected blade position.

6. The method of claim 1, wherein the aerodynamic modifying device is selected from the group consisting of turbulator holes, zig-zag (ZZ) turbulator tape, stall strips, vortex generators, Gurney flaps, acoustical flaps and combinations thereof.

7. The method of claim 1, further comprising configuring blades with no aerodynamic modifying devices and measuring noise level with the noise measuring device prior to configuring one or more of the blades with an aerodynamic modifying device.

8. The method of claim 7, further comprising comparing the noise level of the blades with an aerodynamic modifying device with a blade having no aerodynamic modifying device.

9. A method for determining the noise generated by a wind turbine blade comprising:
   providing at least one noise measuring device;
   arranging and disposing the noise measuring device in a position to measure noise of the blades during rotation;
   configuring one or more of the blades with an aerodynamic modifying device selected from the group consisting of turbulator holes, zig-zag (ZZ) turbulator tape, stall strips, vortex generators, Gurney flaps, acoustical flaps and combinations thereof;
   configuring the wind turbine to include a rotational trigger, the rotational trigger being arranged to provide a signal at a predetermined rotational position of the wind turbine blades;
   measuring noise with the at least one noise measuring device during wind turbine operation;
   measuring time between signals generated by the rotational trigger;
   correlating the noise level measured by the noise measuring device to the time between signals to determine the noise generated by each blade during operation; determining the noise level produced by each of the blades; and
   configuring one or more blades in response to the noise level determined.

10. The method of claim 9, wherein the noise measuring device is a microphone.

11. The method of claim 9, wherein the rotational trigger is a mechanical feature on a shaft around which the blades rotate.

12. The method of claim 9, wherein the rotational trigger is configured to activated at a preselected blade position.

13. The method of claim 9, wherein the rotational trigger is an electronic switch arranged to be activated at a preselected blade position.

14. A wind turbine configured for desired noise production comprising:
   a plurality of wind turbine blades;
   a rotational trigger arranged and disposed to provide a signal at a predetermined rotational position of the blades; and
   wherein each of the blades is individually configured for noise reduction, the configuration including one or more of the blades having aerodynamic modification devices, the arrangement of the aerodynamic modification devices being determined by noise measured on each individual blade.

15. The turbine of claim 14, wherein the rotational trigger is a mechanical feature on a shaft around which the blades rotate.

16. The turbine of claim 14, wherein the rotational trigger is configured to activated at a preselected blade position.

17. The turbine of claim 14, wherein the rotational trigger is an electronic switch arranged to be activated at a preselected blade position.

18. The turbine of claim 14, wherein the aerodynamic modifying device is selected from the group consisting of turbulator holes, zig-zag (ZZ) turbulator tape, stall strips, vortex generators, Gurney flaps, acoustical flaps and combinations thereof.

* * * * *